(12) United States Patent
Yu et al.

(10) Patent No.: US 9,023,967 B2
(45) Date of Patent: May 5, 2015

(54) LONG CHAIN BRANCHED POLYMERS AND METHODS OF MAKING SAME

(75) Inventors: Youlu Yu, Bartlesville, OK (US); Eric D. Schwerdtfeger, Bartlesville, OK (US); Max P. McDaniel, Bartlesville, OK (US); Alan L. Solenberger, Bartlesville, OK (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 801 days.

(21) Appl. No.: 13/308,289

(22) Filed: Nov. 30, 2011

(65) Prior Publication Data

US 2013/0137839 A1 May 30, 2013

(51) Int. Cl.
 C08F 10/02 (2006.01)
 C08F 4/02 (2006.01)
 C08F 4/69 (2006.01)
 C08F 110/02 (2006.01)

(52) U.S. Cl.
 CPC ............... C08F 110/02 (2013.01); C08F 4/025 (2013.01); C08F 4/69 (2013.01); C08F 2500/04 (2013.01); C08F 2500/09 (2013.01)

(58) Field of Classification Search
 USPC .................................... 526/90, 194, 348, 352
 See application file for complete search history.

(56) References Cited

U.S. PATENT DOCUMENTS 3,248,179 A 4/1966 Norwood
3,622,521 A 11/1971 Hogan et al.
3,887,494 A 6/1975 Dietz
4,280,141 A 7/1981 McCann et al.
4,446,243 A 5/1984 Chester et al.
(Continued)

FOREIGN PATENT DOCUMENTS

EP 0088989 A2 9/1983
EP 0314385 A2 5/1989
(Continued)

OTHER PUBLICATIONS

Bird, R. Byron, et al., "Dynamics of polymeric liquids," Fluid Mechanics, 1987, pp. 171-172 plus 8 pages including cover, publishing, and contents information, vol. 1, Second Edition, John Wiley & Sons, Inc.

(Continued)

Primary Examiner — Richard A Huhn
(74) Attorney, Agent, or Firm — Conley Rose, P.C.; Rodney B. Carroll; Cheryl L. Huseman

(57) ABSTRACT

A polymer having a long chain branching content peaking at greater than about 20 long chain branches per million carbon atoms, and a polydispersity index of greater than about 10 wherein the long chain branching decreases to approximately zero at the higher molecular weight portion of the molecular weight distribution. A polymer having a long chain branching content peaking at greater than about 8 long chain branches per million carbon atoms, a polydispersity index of greater than about 20 wherein the long chain branching decreases to approximately zero at the higher molecular weight portion of the molecular weight distribution. A polymer having a long chain branching content peaking at greater than about 1 long chain branches per chain, and a polydispersity index of greater than about 10 wherein the long chain branching decreases to approximately zero at the higher molecular weight portion of the molecular weight distribution.

14 Claims, 7 Drawing Sheets

(56) References Cited

U.S. PATENT DOCUMENTS

| | | | |
|---|---|---|---|
| 4,501,885 | A | 2/1985 | Sherk et al. |
| 4,588,790 | A | 5/1986 | Jenkins, III et al. |
| 5,284,926 | A | 2/1994 | Benham et al. |
| 5,352,749 | A | 10/1994 | DeChellis et al. |
| 5,436,304 | A | 7/1995 | Griffin et al. |
| 5,455,314 | A | 10/1995 | Burns et al. |
| 5,565,175 | A | 10/1996 | Hottovy et al. |
| 5,575,979 | A | 11/1996 | Hanson |
| 6,239,235 | B1 | 5/2001 | Hottovy et al. |
| 6,262,191 | B1 | 7/2001 | Hottovy et al. |
| 6,624,324 | B2 | 9/2003 | Iwakura et al. |
| 6,657,023 | B2 | 12/2003 | Bergmeister et al. |
| 6,707,498 | B1 | 3/2004 | Toma et al. |
| 6,833,415 | B2 | 12/2004 | Kendrick et al. |
| 6,855,781 | B2 | 2/2005 | Bergmeister et al. |
| 7,088,394 | B2 | 8/2006 | Rossi et al. |
| 7,390,395 | B2 | 6/2008 | Elomari |
| 7,700,516 | B2 | 4/2010 | McDaniel et al. |
| 2004/0026324 | A1 | 2/2004 | Luca |
| 2005/0153830 | A1 | 7/2005 | Jensen et al. |

FOREIGN PATENT DOCUMENTS

| | | |
|---|---|---|
| EP | 0085857 B1 | 8/1989 |
| EP | 0337365 A2 | 10/1989 |
| EP | 0339571 A1 | 11/1989 |
| EP | 0455444 A1 | 11/1991 |
| EP | 0589643 A1 | 3/1994 |
| EP | 1845110 | 10/2007 |
| WO | 9311173 A1 | 6/1993 |
| WO | 2009042149 A2 | 4/2009 |
| WO | 2009042149 A3 | 4/2009 |
| WO | WO2010/034464 | 4/2010 |
| WO | WO2012/040144 | 3/2012 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, No. 31, American Chemical Society.

Conway, Steven J., et al., "Chromia/silica-titania cogel catalysts for ethene polymerisation," J. Chem. Soc., Faraday Trans. I, 1989, pp. 71-78, vol. 85, No. 1.

Conway, Steven J., et al., "Chromia/silica-titania cogel catalysts for ethene polymerisation," J. Chem. Soc., Faraday Trans. I, 1989, pp. 79-90, vol. 85, No. 1.

Conway, Steven J., et al., "Chromia/silica-titania cogel catalysts for ethene polymerisation," J. Chem. Soc., Faraday Trans. I, 1989, pp. 1841-1851, vol. 85, No. 7.

Ellison, Alan, et al., "Characterisation of Cr/silica catalysts; Part 2—Ti- and Mg-modified catalysts," J. Chem. Soc. Faraday Trans., 1993, pp. 4393-4395, vol. 89, No. 24.

Ellison, Alan, et al., "Characterisation of modified Cr-silica catalysts," Journal of Molecular Catalysis, 1994, pp. 81-86, vol. 90, Elsevier Science B.V.

Foreign communication from a related counterpart application—International Search Report and Written Opinion, PCT/US2008/011068, Mar. 23, 2009, 18 pages.

Hieber, C. A., et al., "Some correlations involving the shear viscosity of polystyrene melts," Rheologica Acta, 1989, pp. 321-332, vol. 28, No. 4.

Hieber, C. A., et al., "Shear-rate-dependence modeling of polymer melt viscosity," Polymer Engineering and Science, Jul. 1992, pp. 931-938, vol. 32, No. 14.

Mabilon, G., et al., "Copolymérisation éthyléne-propyléne par des catalyseurs ál'oxyde de chrome," Eur. Polym. J., 1985, pp. 245-249, vol. 21, No. 3, Pergamon Press Ltd.

McDaniel, M. P., et al., "The activation of the Phillips polymerization catalyst," Journal of Catalysis, 1983, pp. 118-126, vol. 82, Academic Press, Inc.

Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.

Pullukat, Thomas J., et al., "Titanium modified chromium catalysts for ethylene polymerization," Symposium on Transition Metal Catalysts Polymerization, Michigan Molecular Institute, Aug. 1981, pp. 697-712.

Rebenstorf, B., et al., "Influence of chromium concentration and addition of fluorine, titanium, or boron on the chromium species of the Phillips catalyst: a quantitative evaluation," Langmuir, 1991, pp. 2160-2165, vol. 7, No. 10, American Chemical Society.

Yu, Youlu, et al., "Size-exclusion chromatography coupled to multiangle light scattering detection of long-chain branching in polyethylene made with phillips catalyst," Journal of Polymer Science Part A: Polymer Chemistry, 2012, pp. 1166-1173, vol. 50, Wiley Periodicals, Inc.

Product Information, "LUDOX ® SM-AS Colloidal Silica," 2005, W. R. Grace & Co.-Conn., 2 pages.

Filing receipt and specification for patent application entitled "Methods of preparing a catalyst," by Max P. McDaniel, et al., filed Dec. 2, 2011 as U.S. Appl. No. 13/310,570.

International Application PCT/US2012/064986 Search Report dated Jan. 25, 2013.

LONG CHAIN BRANCHED POLYMERS AND METHODS OF MAKING SAME

TECHNICAL FIELD

The present disclosure relates to novel polymer compositions and methods of making and using same. More specifically, the present disclosure relates to polymer compositions having long chain branching.

BACKGROUND

Polymeric compositions, such as polyethylene compositions, are used for the production of a wide variety of articles. The use of a particular polymeric composition in a particular application will depend on the type of physical and/or mechanical properties displayed by the polymer. Thus, there is an ongoing need to develop polymers that display novel physical and/or mechanical properties and methods for producing these polymers.

SUMMARY

Disclosed herein is a polymer having a long chain branching content peaking at greater than about 20 long chain branches per million carbon atoms, and a polydispersity index ($M_w/M_n$) of greater than about 10 wherein the long chain branching decreases to approximately zero at the higher molecular weight portion of the molecular weight distribution.

Further disclosed herein is a polymer having a long chain branching content peaking at greater than about 8 long chain branches per million carbon atoms, a polydispersity index of greater than about 20 wherein the long chain branching decreases to approximately zero at the higher molecular weight portion of the molecular weight distribution.

Also disclosed herein is a polymer having a long chain branching content peaking at greater than about 1 long chain branches per chain, and a polydispersity index of greater than about 10 wherein the long chain branching decreases to approximately zero at the higher molecular weight portion of the molecular weight distribution.

Also disclosed herein is a method of polymerizing a monomer comprising contacting the monomer with a chromium-supported catalyst under conditions suitable for the formation of a polymer; and recovering the polymer wherein the chromium supported catalyst comprises a silica support having a surface area of less than about 200 m²/g and wherein the polymer has a long chain branching content peaking at greater than about 20 long chain branches per million carbon atoms.

DETAILED DESCRIPTION

Figure 1:
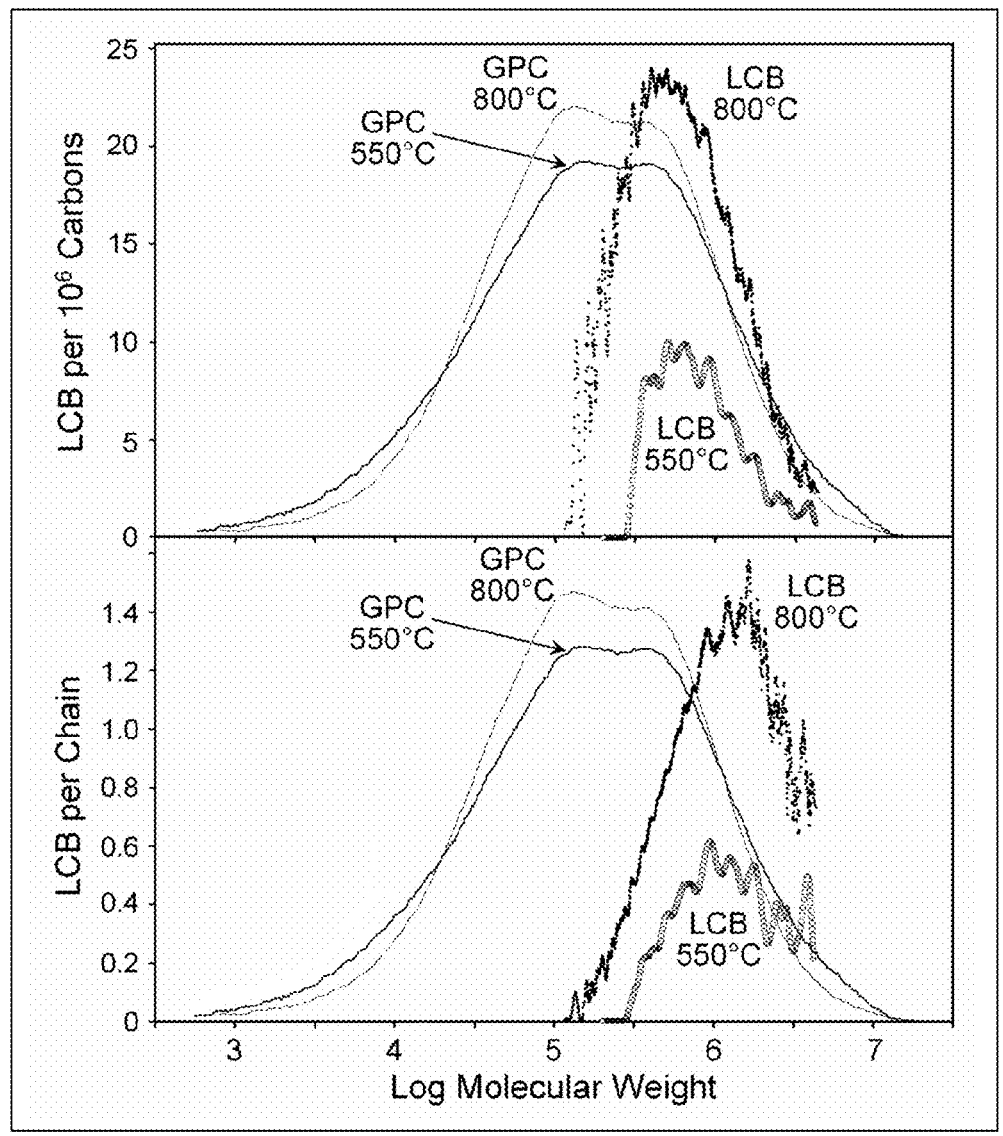
FIGS. 1-7 are plots of the long chain branching content as a function of molecular weight for the samples from the examples.

Disclosed herein are novel polymer compositions and methods of making same. In an embodiment the polymer compositions comprise long chain branched polymers designated (LCBP). Hereinafter, the polymer refers both to the material collected as the product of a polymerization reaction and the polymeric composition comprising the polymer and one or more additives.

LCBPs may be produced using catalysts comprising chromium and a low-surface area support. Hereinafter, such catalysts are termed catalysts for production of long chain branched polymers and designated Cr—X. In an embodiment, a LCBP is prepared by a methodology that employs a Cr—X catalyst and at least one modification. Herein, a modification refers to a specified reactant and/or reaction conditions that is employed in preparation of the polymer, as described in more detail herein.

In an embodiment, the LCBP is prepared by a methodology employing a Cr—X catalyst and at least one Class A modification. Herein, a Class A modification refers to a change in the type of catalyst employed in the reaction for preparation of a LCBP. In an embodiment, the Class A modification comprises activating the Cr—X catalyst at a temperature of less than about 650° C. In an embodiment, the Class A modification comprises adjusting the amount of Cr present on the support to provide a chromium distribution of greater than about 2 chromium atoms per nm² of support. In an embodiment the Class A modification comprises incorporating titanium into the Cr—X.

In an embodiment, the LCBP is prepared by a methodology employing a Cr—X catalyst and a Class B modification. Herein, a Class B modification refers to a change in the type and/or amount of reactants employed in the reaction for preparation of a LCBP. In an embodiment the Class B modification comprises providing a monomer concentration in the reactor that is less than about 1 mole/liter (mol/L). In an embodiment, the Class B modification comprises employing a cocatalyst in the reaction for production of the LCBP. LCBPs and methodologies for preparation of a LCBP are described in more detail herein.

In an embodiment, a Cr—X catalyst is used to prepare a LCBP of the type disclosed herein. The Cr—X catalyst may comprise chromium and a catalyst support.

In an embodiment, the support of the Cr—X catalyst may primarily include an inorganic oxide such as silica, alumina, aluminophosphates, or mixtures thereof. In an embodiment, the support contains greater than about 50 percent (%) silica, alternatively greater than about 80% silica, by weight of the support. The support may further include additional components that do not adversely affect the catalyst system, such as zirconia, alumina, boria, thoria, magnesia, or mixtures thereof.

In an embodiment, the support comprises a precipitated silica. For example, the support may comprise a precipitated or gelled silica. Herein, a gelled or precipitated silica contains a three-dimensional network of primary silica particles.

In an embodiment, the support is a reinforced support. Such reinforced supports may be prepared by any suitable methodology. For example, a reinforced support suitable for use in the present disclosure is prepared by aging of the support material. For example, the support may be alkaline aged by contacting the support with an alkaline solution containing one or more basic compounds (e.g., bases, buffer) having a pH of from about 8 to about 13, alternatively from about 9 to about 12, or alternatively from about 9 to about 10 at a temperature of from about 60° C. to about 90° C., or from about 70° C. to about 85° C., or at about 80° C. The alkaline solution may be comprised of any components which provide a solution pH in the disclosed ranges and are compatible with the other components of the composition. For example, the alkaline solution may comprise ammonium hydroxide, potassium hydroxide, sodium hydroxide, trialkylammonium hydroxide, sodium silicate and the like. Other suitable compounds and amounts effective to provide a solution in the disclosed pH ranges may be utilized.

In an alternative embodiment, the support may be aged by contact with a neutral solution (neutral aging) having a pH of about 7 at a temperature of from about 60° C. to about 90° C., or from about 70° C. to about 85° C., or at about 80° C.

Optional aging of the support (alkaline or neutral) may be carried out for a time period sufficient to lower the surface area of the support to less than about 80% of the original value of the surface area of an otherwise similar material that has not been aged, alternatively to less than about 70%, 60%, or 50%. In an embodiment, the aging is carried out for a period of time of from about 1 hour to about 24 hours, or from about 2 hours to about 10 hours, or from about 3 hours to about 6 hours.

In an embodiment, a method for preparation of a reinforced support further comprises drying the support. The support may be dried to remove solvent and form a dried support. The drying may be carried out in a temperature range of from about 25° C. to about 300° C., alternatively from about 50° C. to about 200° C., or alternatively from about 80° C. to about 150° C. and for a time period of from about 0.1 min to about 10 hours, alternatively from about 0.2 min to about 5 hours, or alternatively from about 30 min to about 1 hour. In an embodiment, a method for preparation of a reinforced support further comprises calcining the dried support to form a dried calcined support. For example, the dried support may be calcined in the presence of air at a temperature in the range of from about 400° C. to about 1,000° C., alternatively from about 500° C. to about 900° C., and for a time period of from about 1 hour to about 30 hours, alternatively from about 2 hours to about 20 hours, or alternatively from about 5 hours to about 12 hours.

In an embodiment, the reinforced support is prepared by hydrothermal treatment (steaming) of the support to lower the surface area. Alternatively, the reinforced support is prepared by thermal sintering of the support. Alternatively, the reinforced support is prepared by chemical sintering of the support such as by using a fluxing agent like sodium ions or potassium ions during thermal treatment. Alternatively, the reinforced support is prepared by a methodology involving a secondary deposition of silica onto a silica, using for example sodium silicate, or tetraethylorthosilicate, or $SiCl_4$, etc. Alternatively the reinforced support is prepared by a combination of two or more of the disclosed methodologies. For example the reinforced support may be prepared by alkaline aging and hydrothermal treatment.

In an embodiment, the support is a low surface area support. Herein, a low surface area support has a surface area of less than about 250 $m^2/g$, alternatively less than about 200 $m^2/g$, alternatively less than about 150 $m^2/g$, or alternatively less than about 125 $m^2/g$. Further, the pore volume of the support may range from about 0.5 cubic centimeters per gram (cc/g) to about 3.5 cc/g or alternatively from about 0.8 cc/g to about 3 cc/g. Hereinafter for simplicity, the disclosure will refer to silica as the support although other supports such as have been described herein may be contemplated.

The amount of support present in the catalyst (e.g., Cr—X) may range from about 90% to about 99.9% by weight of the catalyst, alternatively from about 95% to about 99.9%, or from about 97% to about 99.9%. In an embodiment, the support comprises the remainder of the catalyst when all other components are accounted for.

In an embodiment, the catalyst comprises chromium. Chromium may be included in the Cr—X catalyst by contacting of a chromium-containing compound with a support of the type previously described herein. The chromium-containing compound may comprise a water-soluble chromium compound. Alternatively, the chromium-containing compound comprises a hydrocarbon-soluble chromium compound. Examples of water-soluble chromium compounds include without limitation chromium oxide, chromium trioxide, chromium acetate, chromium nitrate, or combinations thereof. Examples of hydrocarbon-soluble chromium compounds include without limitation tertiary butyl chromate, a diarene chromium (0) compound, biscyclopentadienyl chromium(II), chromium (III) acetylacetonate, or combinations thereof. In one embodiment, the chromium-containing compound may be a chromium (II) compound, chromium (III) compound, or combinations thereof. Suitable chromium (III) compounds include, but are not limited to chromium carboxylates, chromium naphthenates, chromium halides, chromium sulfate, chromium nitrate, chromium dionates, or combinations thereof. Specific chromium (III) compounds include, but are not limited to, chromium (III) sulfate, chromium (III) chloride, chromium (III) nitrate, chromic bromide, chromium (III) acetylacetonate, chromium (III) acetate. Suitable chromium (II) compounds include, but are not limited to chromous chloride, chromous bromide, chromous iodide, chromium (II) sulfate, chromium (II) acetate, or combinations thereof.

The amount of chromium present in the catalyst (e.g., Cr—X) may range from about 0.01% to about 10% by weight of the catalyst, alternatively from about 0.5% to about 5%, or from about 1.0% to about 3%. Herein, the percentage chromium refers to the final percent chromium associated with the support material by total weight of the material after all processing steps.

In an embodiment, chromium is present in an amount sufficient to provide a chromium(VI) distribution of greater than about 2 chromium atoms per $nm^2$ of support, alternatively greater than about 2.5 chromium atoms per $nm^2$ of support, or alternatively greater than about 3 chromium atoms per $nm^2$ of support. In some embodiments, the chromium (VI) distribution is the average distribution based on the use of more than one catalyst type. For example, a chromium distribution falling within the values disclosed herein may be achieved through the use a conventional Cr-supported catalyst and a Cr—X catalyst of the type disclosed herein.

In another embodiment, a method of preparing a Cr—X catalyst comprises contacting a support of the type disclosed herein with a chromium-containing compound to form Cr-silica. The chromium-containing compound may be a water-soluble compound or a hydrocarbon-soluble compound such as those previously described herein and may be introduced to the support using any suitable contacting technique. For example, the chromium-containing compound may be contacted with the silica support using techniques such as ion-exchange, incipient wetness, pore fill, impregnation, etc.

The Cr-silica may then be dried to remove solvent at temperatures ranging from about 25° C. to about 300° C., alternatively from about 50° C. to about 200° C., or alternatively from about 80° C. to about 150° C. and for a time period of from about 0.1 min to about 10 hours, alternatively from about 0.2 min to about 5 hours, alternatively from about 30 min to about 1 hour, thereby forming a dried Cr-silica.

In an embodiment, the dried Cr-silica is activated to produce an active catalyst, alternatively an active polymerization catalyst. The dried Cr-silica of the present disclosure may be activated using various types of activator equipment. Any vessel or apparatus may be utilized to activate the dried Cr-silica including for example rotary calciners, static pan driers, or fluidized beds. Such equipment may operate in a static, batch, or continuous mode. For the static or batch mode, a vessel or apparatus containing the catalyst bed may be subjected sequentially to various stages of the activation process. For the continuous mode, the stages of the process can occur in a series of zones through which the dried Cr-silica passes on its path through the activation apparatus.

In an embodiment, the dried Cr-silica is activated in a fluidized bed activator. In a fluidized bed activator, gas may flow upward through a grid plate containing many small holes upon which the dried Cr-silica is positioned. The gas may contain various compounds to create a desirable process conditions. The dried Cr-silica may be mixed in the gas as it flows creating a fluid-like flow. This is often referred to as fluidization or fluidizing.

The activation may further comprise heating the dried Cr-silica to a desired temperature in one or more stages. As used herein, the term "stages" refers to heating the dried Cr-silica to a desired temperature and holding the temperature for a period of time. A stage may be performed when the dried Cr-silica is in a stationary position or by moving the dried Cr-silica through various locations and may comprise a ramp up time to a desired temperature and holding the dried Cr-silica at that temperature for a certain hold time. For two or more stages, there will be two or more ramp up times, two or more desired temperatures, and two or more hold times. The ramp up times may be the same or different, for example the ramp up time may be instantaneous (e.g., preheated environment) to less than about 3 hours.

The temperature(s) at which the dried Cr-silica is activated may be adjusted to achieve a user-desired result. For example, if the dried Cr-silica activation is used to fulfill a condition for preparation of a LCBP (e.g., a Class A modification), the activation may be carried out by heating the dried Cr-silica to temperatures of less than about 650° C., alternatively less than about 625° C., or alternatively less than about 600° C. In an alternative embodiment, the dried Cr-silica activation is not used to fulfill a condition for the preparation of a LCBP. In such an embodiment, the dried Cr-silica may be activated at temperature(s) in a range of from about 400° C. to about 1000° C., alternatively from about 600° C. to about 900° C., alternatively from about 750° C. to about 900° C.

Activation also causes oxidation of any of the trivalent form of chromium (Cr(III)) to the hexavalent form (Cr(VI)) and then stabilization of the Cr(VI) form. As used herein, the term "stabilization" refers to the activation process resulting in the Cr(VI) form of the catalyst. The activation process may convert from about 10 to about 100% of Cr(III) to Cr(VI), or from about 30 to about 80%, or from about 35 to about 65% and yield from about 0.1 to about 5% Cr(VI), from about 0.5 to about 3.0%, or from about 1.0 to about 3.0% wherein the percentage refers to the weight percent chromium (VI) based on the total weight of the catalyst. In an embodiment, the dried Cr-silica is activated as described herein to form a Cr—X.

In an embodiment, a LCBP is prepared using a titanium-containing Cr—X catalyst. The titanium-containing Cr—X catalyst may comprise chromium and a support, both of the type previously disclosed herein. Additionally, the titanium-containing Cr—X catalyst comprises titanium.

The silica-titanium Cr—X catalyst may be prepared by cogelation or by contacting a support of the type previously disclosed herein with a solution or vapor containing a titanium compound. For example, one can use an aqueous solution comprising a trivalent titanium ($Ti^3$)-containing compound and/or a tetravalent titanium ($Ti^4$)-containing compound. The $Ti^{4+}$-containing compound may be any compound that comprises tetravalent titanium, alternatively the $Ti^{4+}$-containing compound may be any compound that is soluble in an aqueous solution and able to release a $Ti^{4+}$ species into solution. Examples of $Ti^{4+}$-containing compounds suitable for use in the present disclosure include without limitation titanyl nitrate. The $Ti^{3+}$-containing compound may be any compound that comprises trivalent titanium, alternatively the $Ti^{3+}$ containing compound may be any compound that is soluble in an aqueous solution and able to release a $Ti^{3+}$ species into solution. Examples of suitable $Ti^{3+}$-containing compounds include without limitation $TiCl_3$, $(Ti)_2(SO_4)_3$, $Ti(OH)Cl_2$, $TiBr_3$, and the like.

In an embodiment, the support is contacted with the $Ti^{3+}$-containing compound and/or $Ti^{4+}$-containing compound by impregnation. The titanium-containing support may then be dried to remove solvent and form a dried titanium-containing support. The drying may be carried out in a temperature range of from about 25° C. to about 300° C., alternatively from about 50° C. to about 200° C., or alternatively from about 80° C. to about 150° C. and for a time period of from about 0.1 min to about 10 hours, alternatively from about 0.2 min to about 5 hours, or alternatively from about 30 min to about 1 hour. In some embodiments, the drying is carried out in an inert atmosphere (e.g. under vacuum, He, Ar or nitrogen gas).

In an alternative embodiment, titanium can be applied to the support by vapor phase deposition or by impregnation of a non-aqueous solution of titanium. Suitable titanium compounds used in this embodiment include without limitation halides and alkoxides of titanium.

The method may further comprise calcining the dried titanium-containing support in the presence of air to oxidize the $Ti^{3+}$ to $Ti^{4+}$ and attach the titanium to the support and form a dried calcined titanium-containing support. For example, the dried titanium-containing support may be calcined in the presence of air at a temperature in the range of from about 400° C. to about 1,000° C., alternatively from about 500° C. to about 900° C., and for a time period of from about 1 hour to about 30 hours, alternatively from about 2 hours to about 20 hours, alternatively from about 5 hours to about 12 hours.

The method may further comprise adding a chromium-containing compound to the dried calcined titanium-containing support to form a Cr/Ti-silica. The chromium-containing compound may be a water-soluble compound or a hydrocarbon-soluble compound such as those previously described herein and may be introduced to the dried calcined titanium-containing support using the contacting techniques also previously described herein. The Cr/Ti-silica may be dried again to remove solvent introduced by the addition of the chromium-containing compound at temperatures ranging from 25° C. to about 300° C., alternatively from about 50° C. to about 200° C., or alternatively from about 80° C. to about 150° C. In one embodiment, the Cr/Ti-silica may then be activated via a second calcination step by heating it in an oxidizing environment to produce a titanium-containing Cr—X. Such activations may be carried out using procedures and equipment of the type previously disclosed herein (e.g., fluidized bed). For example, the Cr/Ti-silica may be calcined in the presence of air at a temperature in the range of from about 400° C. to about 1,000° C., alternatively from about 500° C. to about 850° C. and for a time period of from about 1 min to about 10 hours, alternatively from about 20 min to about 5 hours, or alternatively from about 1 to about 3 hours to produce the titanium-containing Cr—X.

In another embodiment, a method of preparing a titanium-containing Cr—X catalyst comprises contacting a support with a chromium-containing compound to form a Cr-supported composition. The chromium-containing compound may be a water-soluble compound or a hydrocarbon-soluble compound such as those previously described herein and may be introduced to the support using the contacting techniques also previously described herein. The Cr-supported composition may be dried to remove solvent at temperatures ranging from about 25° C. to about 300° C., alternatively from about 50° C. to about 200° C., or alternatively from about 80° C. to about 150° C. and for a time period of from about 0.1 min to about 10 hours, alternatively from about 0.2 min to about 5 hours, alternatively from about 30 min to about 1 hour, thereby forming a dried Cr-supported composition. The method may further comprise contacting the dried Cr-supported composition with a $Ti^{3+}$-containing compound and/or $Ti^{4+}$-containing compound to form a Cr/Ti-silica. The $Ti^{3+}$-containing compound may be contacted with the dried Cr-supported composition using any of the contacting techniques previously described herein. In an embodiment, the dried Cr-supported composition is contacted with a $Ti^{3+}$-containing compound by impregnation with a $Ti^{3+}$-aqueous salt solution to form a Cr/Ti-silica. The method further comprises activating the Cr/Ti-silica by drying and/or calcining the Cr/Ti-silica in the presence of air to oxidize the $Ti^{3+}$ to $Ti^{4+}$ and attach the titanium to the silica. Such activations may be carried out using procedures and equipment of the type previously disclosed herein (e.g., fluidized bed). For example, the Cr/Ti-silica may be heated in the presence of air at a temperature in the range of from about 400° C. to about 1,000° C., alternatively from about 500° C. to about 850° C. and for a time period of from about 1 min to about 10 hours, alternatively from about 20 min to about 5 hours, alternatively from about 1 hour to about 3 hours to produce the titanium-containing Cr—X catalyst.

In another embodiment, a method of preparing a catalyst comprises contacting a support of the type disclosed herein with a $Ti^{3+}$-containing compound and/or $Ti^{4+}$-containing compound and a chromium-containing compound to form a metallated support. The contacting of the support with the $Ti^{3+}$-containing compound and/or $Ti^{4+}$-containing compound and chromium-containing compound may be simultaneous; alternatively the contacting may be carried out sequentially (e.g., $Ti^{3+}$ and/or $Ti^{4+}$ followed by Cr or vice-versa). The $Ti^{3+}$-containing compound and/or $Ti^{4+}$-containing compound and chromium-containing compound may be of the types previously described herein and may be introduced to the support (e.g., low surface area silica) using the contacting techniques also previously described herein to form a metallated silica. The metallated silica may be dried to remove solvent at temperatures ranging from about 25° C. to about 300° C., alternatively from about 50° C. to about 200° C., or alternatively from about 80° C. to about 150° C. and for a time period of from about 0.1 min to about 10 hours, alternatively from about 0.2 min to about 5 hours, alternatively from about 30 min to about 1 hour, thereby forming a dried metallated silica. In one embodiment, the dried metallated silica may then be activated via a calcination step by heating it in an oxidizing environment. Such activations may be carried out using procedures and equipment of the type previously disclosed herein (e.g., fluidized bed). For example, the dried metallated silica may be heated in the presence of air at a temperature in the range of from about 400° C. to about 1,000° C., alternatively from about 500° C. to about 850° C. and for a time of from about 1 min to about 10 hours, alternatively from about 20 min to about 5 hours, alternatively from about 1 to about 3 hours to produce the titanium-containing Cr—X.

In the embodiments wherein a titanium-containing Cr—X catalyst is formed, the amount of titanium utilized may be sufficient to provide a percentage titanium of from about 0.1% to about 10% by weight of the catalyst, or alternatively from about 0.5% to about 8%, alternatively from about 1% to about 5%. Herein, the percentage titanium refers to the final percent titanium associated with the support material by total weight of the material after all processing steps.

Alternatively, in embodiments wherein a titanium-containing Cr—X catalyst is formed, the amount of titanium utilized may be sufficient to provide a titanium distribution of greater than about 2 titanium atoms per $nm^2$ of support, alternatively greater than about 2.5 titanium atoms per $nm^2$ of support, or alternatively greater than about 3 titanium atoms per $nm^2$ of support.

It is contemplated that the temperature(s) at which the composition comprising chromium, titanium and silica (e.g., Cr/Ti-silica, metallated silica) is activated to form an activated catalyst may be adjusted to achieve a user desired result. For example, if activation of the composition comprising chromium, titanium and silica is used to fulfill a condition for preparation of a LCBP (e.g., a Class A modification) the activation may be carried out by heating the catalyst comprising chromium, titanium and silica to temperatures of less than about 650° C., alternatively less than about 625° C., or alternatively less than about 600° C. In an alternative embodiment, if activation of the composition comprising chromium, titanium and silica is used to fulfill a condition for preparation of a LCBP (e.g., a Class A modification) the activation may be carried out by heating the catalyst comprising chromium, titanium and silica to temperatures of greater than about 700° C., alternatively greater than about 800° C., or alternatively greater than about 850° C.

In an embodiment, a catalyst for use in the preparation of a LCBP has a catalytic activity of greater than about 750 grams polymer product per gram catalyst used (g/g), alternatively greater than about 1000 g/g, alternatively greater than about 1500 g/g, or alternatively greater than about 2000 g/g.

In an embodiment, a LCBP of the type disclosed herein is prepared by a methodology employing a Cr—X catalyst and a Class A modification. In an embodiment, the Class A modification comprises activating the Cr—X catalyst at a temperature of less than about 650° C. as described previously herein. In an embodiment, the Class A modification comprises adjusting the amount of Cr on the support (e.g., low surface area silica) to provide a chromium distribution of greater than about 2 chromium atoms per $nm^2$ of support as described previously herein. In an embodiment, the Class A modification comprises incorporating titanium into the Cr—X catalyst to form a titanium-containing Cr—X catalyst as disclosed previously herein.

The Class A modifications disclosed herein result in catalysts that may be suitably employed in an olefin polymerization method. The catalysts of the present disclosure are suitable for use in any olefin polymerization method, using various types of polymerization reactors. In an embodiment, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

In an embodiment, the LCBP is prepared by a methodology employing a Cr—X catalyst and a Class B modification. In an embodiment the Class B modification comprises providing that the concentration of monomer present in the reactor is less than about 1 mole/liter (mol/L), alternatively less than about 0.75 mol/L, or alternatively less than about 0.5 mol/L. Examples of monomers suitable for use in the present disclosure include without limitation mono-olefins containing 2 to 8 carbon atoms per molecule such as ethylene, propylene, 1-butene, 1-pentene, 1-hexene, and 1-octene. In an embodiment, the monomer comprises ethylene. In embodiments wherein the monomer is a gas (e.g. ethylene), the polymerization or oligomerization reaction can be carried out under a monomer gas pressure. When the polymerization or oligomerization reaction produces polyethylene or alpha olefins, the reaction pressure can be the monomer ethylene pressure. In some embodiments, the ethylene pressure can be greater than 0 psig (0 KPa); alternatively, greater than 50 psig (344 KPa); alternatively, greater than 100 psig (689 KPa); or alternatively, greater than 150 psig (1.0 MPa). In other embodiments, the ethylene pressure can range from 0 psig (0 KPa) to 5,000 psig (34.5 MPa); alternatively, 50 psig (344 KPa) to 4,000 psig (27.6 MPa); alternatively, 100 psig (689 KPa) to 3,000 psig (20.9 MPa); or alternatively, 150 psig (1.0 MPa) to 2,000 psig (13.8 MPa). In some cases when ethylene is the monomer, inert gases can form a portion of the total reaction pressure. In the cases where inert gases form a portion of the reaction pressure, the previously stated ethylene pressures can be the applicable ethylene partial pressures of the polymerization or oligomerization reaction. In the situation where the monomer provides all or a portion of the polymerization or oligomerization reaction pressure, the reaction system pressure can decrease as the gaseous monomer is consumed. In this situation, additional gaseous monomer and/or inert gas can be added to maintain a desired polymerization or oligomerization reaction pressure. In embodiments, additional gaseous monomer can be added to the polymerization or oligomerization reaction at a set rate (e.g. for a continuous flow reactor), at different rates (e.g. to maintain a set system pressure in a batch reactor). In other embodiments, the polymerization or oligomerization reaction pressure can be allowed to decrease without adding any additional gaseous monomer and/or inert gas.

In an embodiment, the Class B modification comprises employing a cocatalyst in the reaction for production of the LCBP. Generally, the cocatalyst can be any organometallic compound capable of activating the catalyst (e.g., Cr—X) to polymerize or oligomerize olefins. Suitable cocatalysts can include without limitation monomeric or oligomeric metal alkyls, metal aryls, metal alkyl-aryls comprising at least one of the metals selected from the group consisting of B, Al, Be, Mg, Ca, Sr, Ba, Li, Na, K, Rb, Cs, Zn, Cd, and Sn. In embodiments, the cocatalyst can be selected from the group consisting of organoaluminum compounds, organoboron compounds, organolithium compounds, or mixtures thereof. In some embodiments, the cocatalyst can be an organoaluminum compound. Applicable organoaluminum compounds can include without limitation trialkylaluminums, alkylaluminum halides, alumoxanes or mixture thereof. In some embodiments, the organoaluminum compound can be trimethylaluminum, triethylaluminum, diethylaluminum chloride, diethylaluminum ethoxide, diethylaluminum cyanide, diisobutylaluminum chloride, triisobutylaluminum, ethylaluminum sesquichloride, methylalumoxane (MAO), modified methylalumoxane (MMAO), isobutyl alumoxanes, t-butyl alumoxanes, or mixtures thereof. In other embodiments, the organoaluminum compounds can include without limitation methylalumoxane (MAO), modified methylalumoxane (MMAO), isobutyl alumoxanes, t-butyl alumoxanes, or mixtures thereof. In other embodiments, the cocatalyst can be methylalumoxane, modified methylalumoxane, or mixtures thereof. In yet other embodiments, the cocatalyst can be methylalumoxane; alternatively, modified methylalumoxane; isobutylalumoxane (IBAO); or alternatively, partially hydrolyzed trialkylaluminum.

In an embodiment, the cocatalyst comprises a compound represented by the general formula $AlR_3$ or $BR_3$. Alternatively, the cocatalyst is triethylboron (TEB). The cocatalyst can be present in the reactor in an amount of greater than about 1 ppm, alternatively greater than about 5 ppm, or alternatively greater than about 8 ppm based on the weight of the solvent or diluent in systems employing such solvent or diluent. When no solvent or diluent is used, the catalyst (e.g., Cr—X) may be impregnated with the cocatalyst in an amount that provides for a cocatalyst to chromium mole ratio in the range of from about 0.1:1 to about 100:1, alternatively from about 0.5:1 to about 50:1, or from about 1:1 to about 10:1.

In an embodiment, a method of making a LCBP of the type disclosed herein comprises employing a Cr—X catalyst and at least one Class A modification, alternatively a Cr—X catalyst and at least one Class B modification, or alternatively a Cr—X catalyst, at least one Class A modification and at least one Class B modification. For example, a method of making a LCBP of the type disclosed herein may comprise employing a Cr—X catalyst wherein the Cr—X catalyst has been activated at a temperature of less than about 650° C.

Alternatively, a method of making a LCBP of the type disclosed herein may comprise employing a Cr—X catalyst wherein the Cr—X catalyst has been activated at a temperature of less than about 650° C. and the amount of Cr present in the reactor has been adjusted to provide a chromium distribution of greater than about 2 chromium atoms per $nm^2$ of support.

Alternatively, a method of making a LCBP of the type disclosed herein may comprise employing a Cr—X catalyst wherein the Cr—X catalyst has been activated at a temperature of less than about 650° C., the amount of Cr present in the reactor has been adjusted to provide a chromium distribution of greater than about 2 chromium atoms per $nm^2$ of support and titanium has been incorporated into the Cr—X catalyst.

Alternatively, a method of making a LCBP of the type disclosed herein may comprise employing a Cr—X catalyst wherein the Cr—X catalyst has been activated at a temperature of less than about 650° C., the amount of Cr present in the reactor has been adjusted to provide a chromium distribution of greater than about 2 chromium atoms per $nm^2$ of support, titanium has been incorporated into the Cr—X catalyst, and the concentration of monomer present in the reactor is less than about 1 mole/liter (mol/L).

Alternatively, a method of making a LCBP of the type disclosed herein may comprise employing a Cr—X catalyst wherein the Cr—X catalyst has been activated at a temperature of less than about 650° C., the amount of Cr present in the reactor has been adjusted to provide a chromium distribution of greater than about 2 chromium atoms per $nm^2$ of support, titanium has been incorporated into the Cr—X catalyst, the concentration of monomer present in the reactor is less than about 1 mol/L, and a cocatalyst is present in the reaction.

Alternatively, a method of making a LCBP of the type disclosed herein may comprise employing a Cr—X catalyst wherein the Cr—X catalyst has been activated at a temperature of less than about 650° C. and a cocatalyst comprising TEB present in the amounts previously disclosed herein. In an embodiment, the methodologies disclosed herein are used to produce a LCBP of the type disclosed herein.

In an embodiment, a LCBP of the type described herein is characterized by a density of from about 0.90 g/cc to about 0.97 g/cc, alternatively from about 0.93 g/cc to about 0.97 g/cc, alternatively from about 0.92 g/cc to about 0.965 g/cc, or alternatively from about 0.93 g/cc to about 0.96 g/cc as determined in accordance with ASTM D1505.

In an embodiment, a LCBP produced using a catalyst of the type described herein has a melt index, MI, in the range of from about 0 dg/min to about 100 dg/min, alternatively from about 0.1 dg/min to about 10 dg/min, alternatively from about 0.1 dg/min to about 3.0 dg/min, or alternatively from about 0.2 dg/min to about 2.0 dg/min. The melt index (MI) refers to the amount of a polymer which can be forced through an extrusion rheometer orifice of 0.0825 inch diameter when subjected to a force of 2160 grams in ten minutes at 190° C., as determined in accordance with ASTM D1238.

The molecular weight distribution (MWD) of the LCBP may be characterized by the ratio of the weight average molecular weight ($M_w$) to the number average molecular weight ($M_n$), which is also referred to as the polydispersity index (PDI) or more simply as polydispersity. The number average molecular weight, $M_n$, is the common average of the molecular weights of the individual polymers calculated by measuring the molecular weight of n polymer molecules, summing the weights, and dividing by n. The weight average molecular weight, $M_w$, describes the molecular weight distribution of a polymer composition and is calculated according to Equation 1:

$$\overline{M}_w = \frac{\sum_i N_i M_i^2}{\sum_i N_i M_i} \quad (1)$$

where $N_i$ is the number of molecules of molecular weight $M_i$. A LCBP of the type disclosed herein may be characterized by a broad molecular weight distribution such that the PDI is equal to or greater than about 10, alternatively greater than about 15, alternatively greater than about 20 or alternatively greater than about 25.

A LCBP of the type disclosed herein may be characterized by the degree of long chain branching (LCB) present in the polymer. LCB was measured using the size-exclusion chromatography-multiangle light scattering technique (SEC-MALS). Methods for the determination of long-chain branching and long-chain branching distribution are described in an article by Yu et al. entitled "SEC-MALS method for the determination of long-chain branching and long-chain branching distribution in polyethylene," *Polymer* (2005) Volume: 46, Issue: 14, Pages: 5165-5182 which is incorporated by reference herein in its entirety.

In an embodiment, a LCBP of the type disclosed herein has a LCB content peaking that is determined as the number of LCB per million carbon atoms which is designated λ. In an embodiment, λ is greater than about 8 LCB per million carbon atoms ($LCB/10^6$ carbons), alternatively greater than about 15 $LCB/10^6$ carbons, alternatively greater than about 20 $LCB/10^6$ carbons, or alternatively greater than about 30 $LCB/10^6$ carbons. Herein, LCB content peaking refers to the maximum concentration of LCB as a function of molecular weight. The number of LCB per $10^6$ total carbons is calculated using the formula $1,000,000*M_0*B/M$, where B is the number of LCB per chain, $M_0$ is the molecular weight of the repeating unit, i.e. the methylene group, —$CH_2$—, for PE; and M is the molecular weight of a SEC slice where it is assumed that all macromolecules in the same SEC slice have the same molecular weight. B is calculated according to the following equation:

$$g = \frac{6}{B}\left\{\frac{1}{2}\left(\frac{2+B}{B}\right)^{1/2} \ln\left[\frac{(2+B)^{1/2}+(B)^{1/2}}{(2+B)^{1/2}-(B)^{1/2}}\right] - 1\right\}$$

wherein g is defined as the ratio of the mean square radius of gyration of a branched polymer to that of a linear polymer of the same molecular weight. Both of the radius of gyration and the molecular weight were determined via SEC-MALS.

In an embodiment, a LCBP of the type disclosed herein has a LCB content peaking that is determined as the number of LCB per chain. In an embodiment, for a LCBP of the type disclosed herein B is greater than about 1.0 LCB/chain, alternatively greater than about 1.3, alternatively greater than about 1.5, or alternatively greater than about 2.0.

In an embodiment, a LCBP of the type disclosed herein displays a LCB content that is characterized by a decrease in the amount of LCB to approximately zero at the higher molecular weight portion of the molecular weight distribution. Herein, the higher molecular weight portion of the molecular weight distribution refers to a molecular weight of greater than about 10 million kg/mol.

In an embodiment, a methodology of the type disclosed herein is used to produce a LCBP characterized by a long chain branching content peaking at greater than about 20 long chain branches per million carbon atoms, and a molecular weight distribution/PDI of greater than about 10 wherein the long chain branching decreases to approximately zero at the higher molecular weight portion of the molecular weight distribution.

In an embodiment, a methodology of the type disclosed herein is used to produce a LCBP characterized by a long chain branching content peaking at greater than about 20 long chain branches per million carbon atoms, and a molecular weight distribution of greater than about 15 wherein the long chain branching decreases to approximately zero at the higher molecular weight portion of the molecular weight distribution.

In an embodiment, a methodology of the type disclosed herein is used to produce a LCBP characterized by a long chain branching content peaking at greater than about 20 long chain branches per million carbon atoms, long chain branching content peaking at greater than about 1.0 long chain branches per chain and a molecular weight distribution of greater than about 10 wherein the long chain branching decreases to approximately zero at the higher molecular weight portion of the molecular weight distribution.

In an embodiment, a methodology of the type disclosed herein is used to produce a LCBP characterized by long chain branching content peaking at greater than about 25 long chain branches per million carbon atoms, and a molecular weight distribution of greater than about 15 wherein the long chain branching decreases to approximately zero at the higher molecular weight portion of the molecular weight distribution.

In an embodiment, a methodology of the type disclosed herein is used to produce a LCBP characterized by a long chain branching content peaking at greater than about 30 long chain branches per million carbon atoms, and a molecular weight distribution of greater than about 15 wherein the long chain branching decreases to approximately zero at the higher molecular weight portion of the molecular weight distribution.

In an embodiment, a methodology of the type disclosed herein is used to produce a LCBP characterized by a long chain branching content peaking at greater than about 8 long chain branches per million carbon atoms, a molecular weight distribution of greater than about 20 wherein the long chain branching decreases to approximately zero at the higher molecular weight portion of the molecular weight distribution.

In an embodiment, a methodology of the type disclosed herein is used to produce a LCBP characterized by a long chain branching content peaking at greater than about 1 long chain branches per chain, and a molecular weight distribution of greater than about 10 wherein the long chain branching decreases to approximately zero at the higher molecular weight portion of the molecular weight distribution.

Polymer resins produced as disclosed herein (i.e., LCBPs) may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth.

EXAMPLES

The following examples are given as particular embodiments of the disclosure and to demonstrate the practice and advantages thereof. It is understood that the examples are given by way of illustration and are not intended to limit the specification or the claims to follow in any manner.

Cr—X catalysts of the type disclosed herein were prepared and used in the formation of a LCBP of the type disclosed herein. Chromium in the form of chromium acetate was impregnated onto a low surface area silica from methanol to a loading of approximately 1.2 $Cr/nm^2$. The low surface area silicas used were SYLOX SD or SM500 which are commercially available from W.R. Grace. SYLOX SD has a surface area of approximately 100 $m^2/g$ and a pore volume of 1.2 mL/g. SYLOX SD is reported to be a "hybrid" between silica gel and precipitated silica. In another experiment a precipitated silica, SM500 was used. SM500 had a surface area of 102 $m^2/g$ and a pore volume of 1.1 mL/g. The silica impregnated with chromium was then dried in a vacuum oven at 100° C. for 12 hours. Cr/silica-titania catalysts were made by first drying the Cr-impregnated SYLOX SD silica at 200° C. overnight, then impregnating titanium tetraisopropoxide from dry heptane to a level of 3 wt % Ti, then evaporating the solvent away. Finally, each dried catalyst was sized through a 35 mesh screen.

To activate the catalyst, about 10 grams was placed in a 4.5 cm quartz tube fitted with a sintered quartz disk at the bottom. While the catalyst was supported on the disk, dry air was blown up through the disk at a linear velocity of 3.0 cm/s. An electric furnace around the quartz tube was then turned on and the temperature was raised at the rate of 400° C./h to the desired temperature, usually 800° C. At that temperature the silica was allowed to fluidize for three hours in the dry air. Afterward, the catalyst was collected and stored under dry nitrogen, where it was protected from the atmosphere until ready for testing.

Comparative experiments were also carried out using the Cr-silica catalyst HA30W whose support has a surface area of 500 $m^2/g$ and a pore volume of 1.6 mL/g or 969 MPI which is also a Cr-silica catalyst with a support surface are of 300 $m^2/g$, and a pore volume of 1.6 mL/g Polymerization runs were made in a 2.65 liter stainless steel reactor equipped with a marine stirrer rotating at 500 rpm. The reactor was surrounded by a stainless steel jacket through which was circulated a stream of hot water which permitted precise temperature control to within half a degree centigrade, with the help of electronic control instruments. Unless otherwise stated, a small amount (typically 0.05 to 0.25 g) of the solid catalyst was first charged under nitrogen into the dry reactor. Next, 1.2 liter of isobutane liquid was added and the reactor heated to the standard 80° C. set temperature. Midway during the isobutane addition, triethylaluminum was added to equal 0.5 ppm of the isobutane (except in experiment 4 where 10 ppm of triethylaluminum or triethylboron was used). Finally, ethylene was added to the reactor to equal the desired pressure, usually 2.76 MPa (400 psig), which was maintained during the experiment. The slurry was stirred for the specified time, usually about one hour, and the polymerization rate was noted by recording the flow of ethylene into the reactor to maintain the set pressure. After the allotted time, the ethylene flow was stopped and the reactor slowly depressurized and opened to recover a granular polymer powder. Dry polymer powder was then removed and weighed. Activity was determined from this weight and the measured time.

Example 1

Catalyst A was a Cr/silica catalyst prepared using SYLOX-SD silica obtained from W.R. Grace. This silica is described as a hybrid between precipitated and gelled silica, and as being "reinforced." It has a surface area of approximately 105 $m^2/g$ and a pore volume of about 1.2 mL/g. This silica was then impregnated with an aqueous solution of chromic acetate to have a 1.2 $Cr/nm^2$ chromium distribution. It was then calcined at 550° C. and in a separate experiment at 800° C. These catalysts were used to polymerize ethylene at 80° C., 400 psig, and 0.5 ppm triethylaluminum as described above. The first catalyst (550° C.) produced an activity of 0.6 kg PE/g/h and the second one (800° C.) produced an activity of 1.6 kg PE/g/h. The polyethylene polymer was analyzed by SEC-MALS measurements which are presented in FIG. 1. FIG. 1 demonstrates the broad molecular weight distribution and also the high LCB content, either as measured per million carbons, or per chain. The polydispersity (i.e. the weight average molecular weight ($M_w$) divided by the number average molecular weight $M_n$ or $M_w/M_n$) was 12.2 when the catalyst was calcined to 800° C. and 26.6 when the catalyst was calcined to 550° C.

Figure 2:
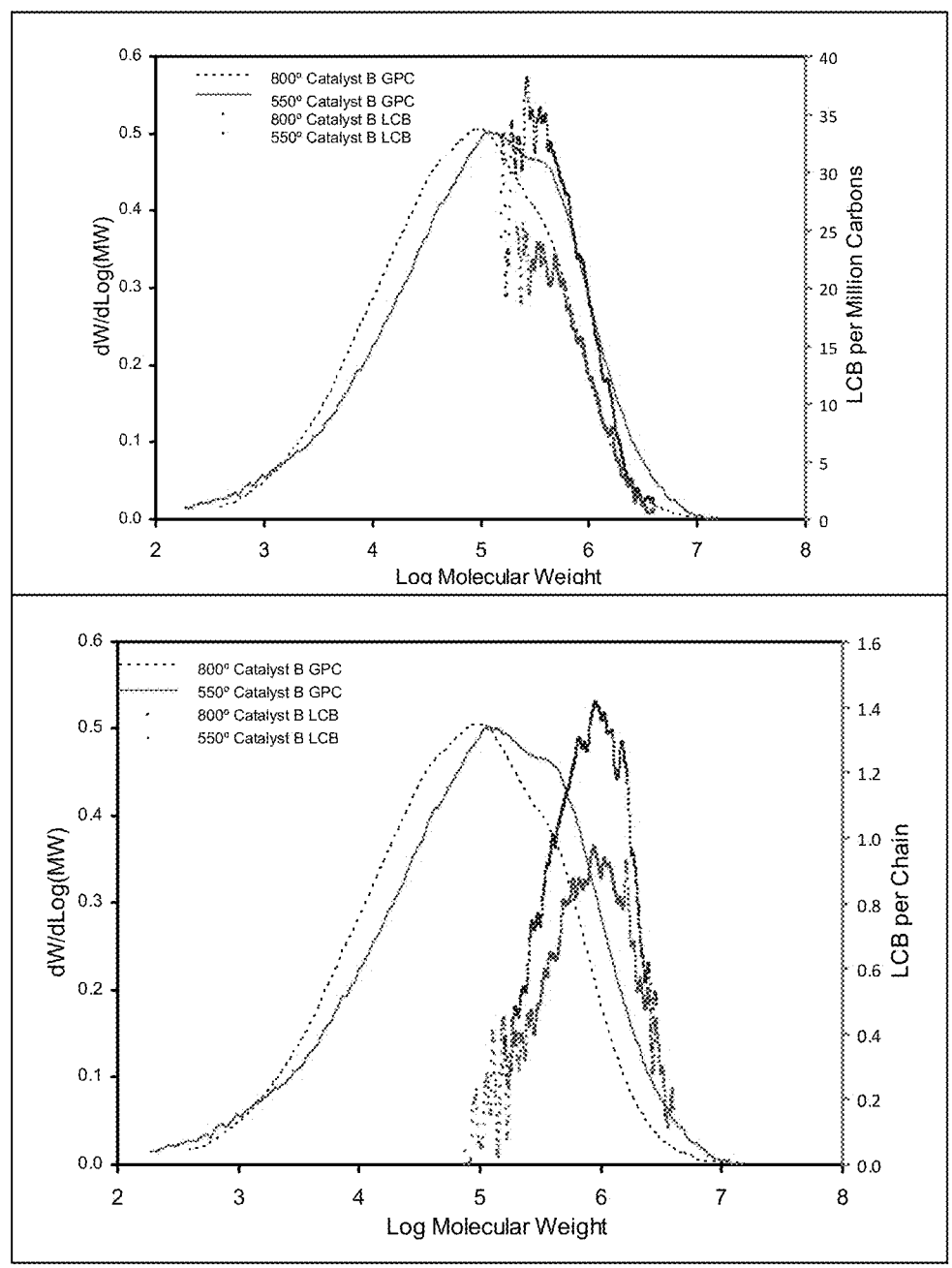

Catalyst B was a Cr/silica-titania catalyst made by first drying the Cr-impregnated SYLOX SD silica at 200° C. overnight, then impregnating titanium tetraisopropoxide from dry heptane solution to a level of 3 wt % Ti, then evaporating the solvent away. Finally, the dried catalyst was sized through a 35 mesh screen. The titanium-containing Cr-silica catalyst had SYLOX-SD as the support and a chromium distribution of 1.2 $Cr/nm^2$. Catalyst B was activated first at 800° C., and tested for ethylene polymerization as described above, using the same conditions (80° C., 400 psig, 0.5 ppm TEA). It produced an activity of 2.8 kg PE/g/h. Another sample of Catalyst B was also activated at 550° C. and was then tested for polymerization activity under similar conditions. It yielded an activity of 1.6 kg PE/g/h. SEC-MALS measurements were carried out on both polymers and are presented in FIG. 2. The molecular weight distribution of samples produced using Catalyst B was broadened by the titanium producing a polydispersity of 21.7 when the catalyst was calcined to 800° C. and 27.6 when the catalyst was calcined to 550° C. These results demonstrate that the effect of including titanium in the catalyst is to enhance LCB content and to broaden the molecular weight distribution.

Figure 3:
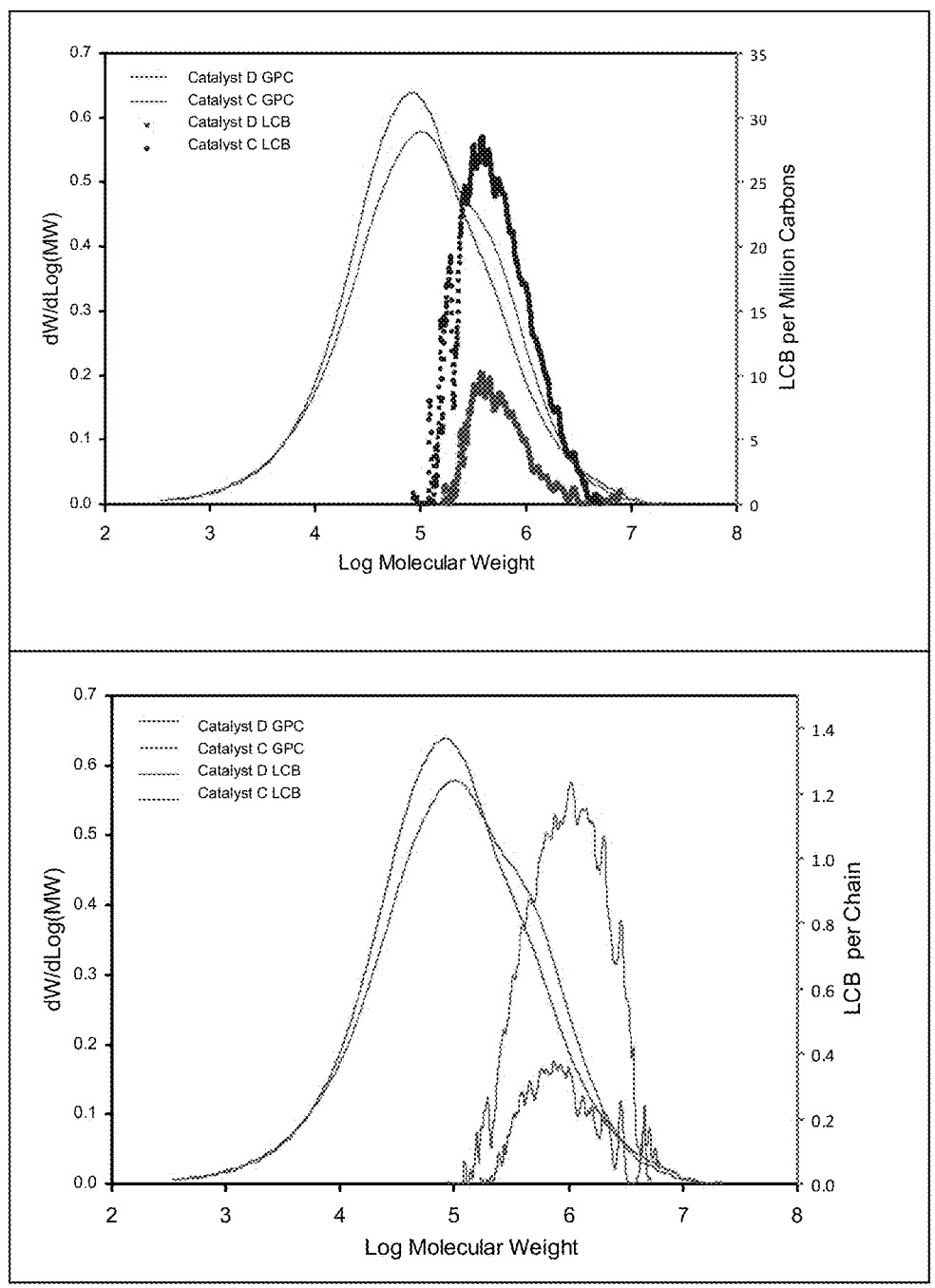

Catalyst C and Catalyst D are comparative Cr-silica catalysts. Catalyst C was prepared using the precipitated silica Grace SM500 as a support, having a surface area of about 100 $m^2/g$, which was impregnated with sufficient chromium to provide a chromium distribution of 1.2 $Cr/nm^2$ and was calcined at 700° C. Catalyst D was the Cr-silica catalyst 969 MPI, having a surface area of about 300 $m^2/g$, which contained 0.4 $Cr/nm^2$ and was calcined at 850° C. Each catalyst was then used to polymerize ethylene at (80° C., 300 psig, 0.5 ppm TEA) with ethylene concentrations ranging from 0.9 mol/L. Catalyst C produced an activity of 0.1 kg PE/g/h and polymer having a polydispersity of 10.9, while Catalyst D produced an activity of 0.5 kg PE/g/h and polymer having a polydispersity of 9.4. SEC-MALS measurements are presented in FIG. 3 on both polymers. A comparison of FIG. 3 to FIG. 1 and FIG. 2 demonstrates the broadened molecular weight distributions observed for catalysts having a low-surface-area, highly reinforced support.

Example 2

Figure 4:
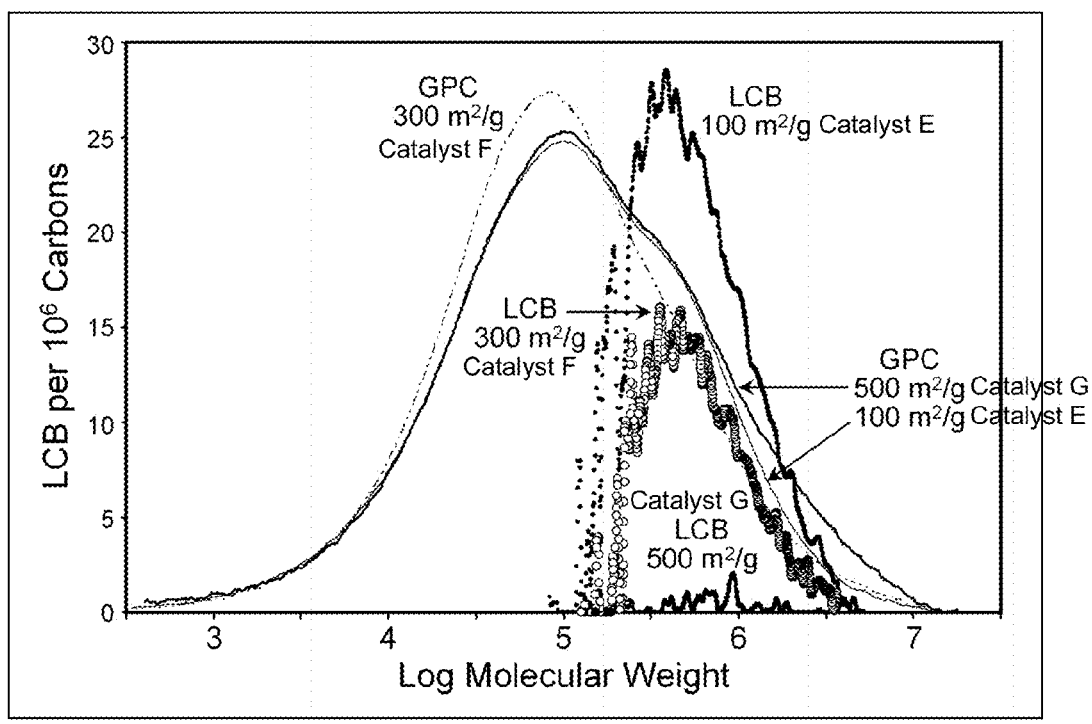

The effect of the surface area of the silica in the catalyst on LCB was investigated further. Catalyst E was a Cr-silica catalyst prepared using SYLOX-SD, having a pore volume of about 1.2 mL/g and a surface area of about 105 $m^2/g$, as the support which was impregnated with sufficient chromium to provide a chromium distribution of 1.2 $Cr/nm^2$. Catalyst F used W.R. Grace grade 952 silica, having a pore volume of 1.6 mL/g and a surface area of 300 $m^2/g$, impregnated with a similar amount of chromium. Catalyst G used W.R. Grace grade HA30W, having a pore volume of 1.6 mL/g and a surface area of about 500 $m^2/g$, also impregnated with a similar amount of chromium. Catalyst F is similar to Catalyst D. Catalysts E, F, and G were calcined at 800° C. and tested for polymerization activity. Polymers were prepared using these Cr—X catalysts of the type disclosed herein (i.e., Catalyst E) at 80° C., 400 psig and 0.5 ppm TEA. Catalyst E produced polymers having a polydispersity of 12.2 and Catalyst F and Catalyst G produced polymers having polydispersities of 13.3 and 11.9 respectively. The results are shown in FIG. 4.

Example 3

Figure 5:
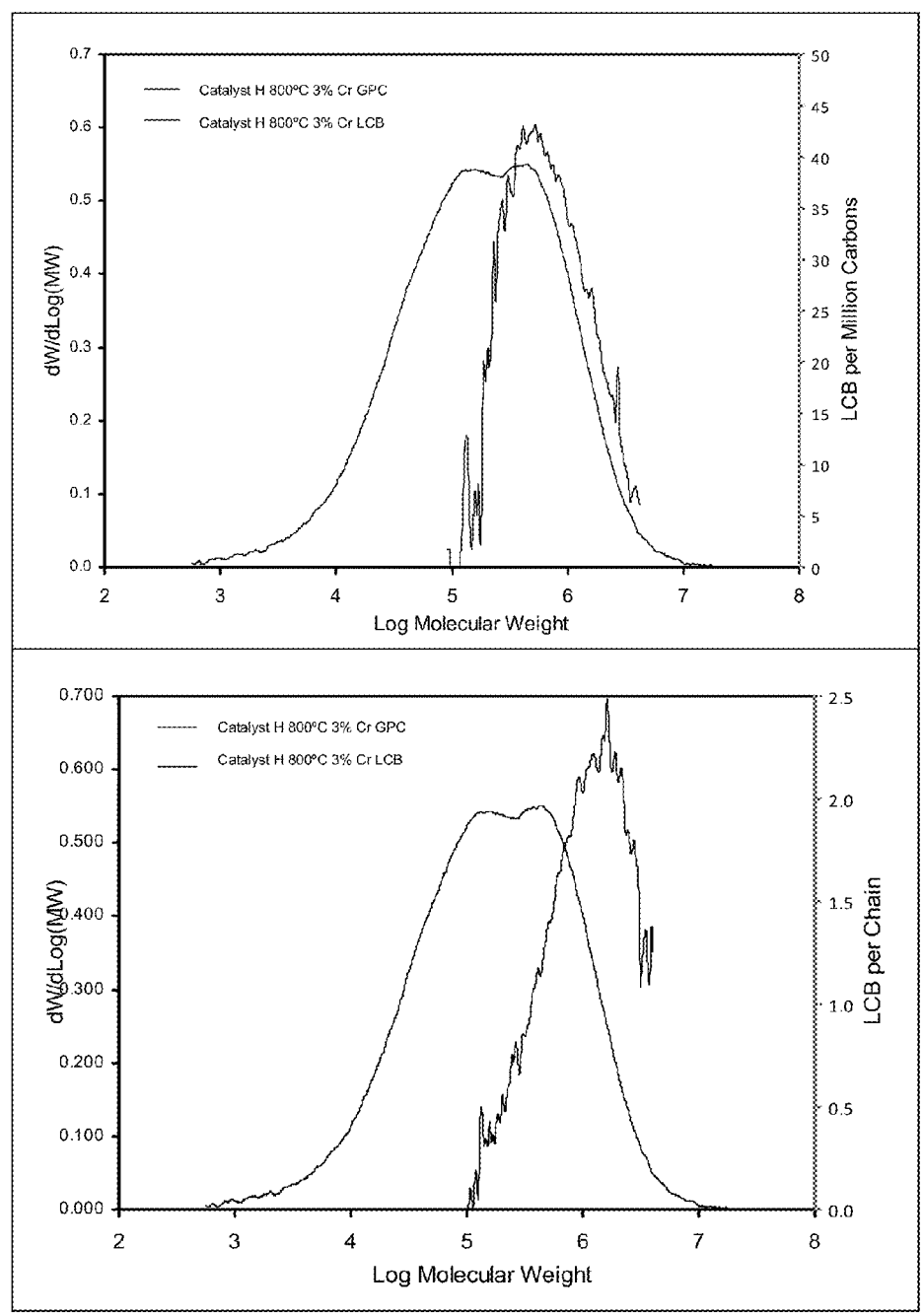

The effect of altering the chromium concentration on the LCB content of the polymers was investigated. Catalyst H was prepared by impregnating SYLOX-SD with chromic acetate to provide a chromium distribution of 3.5 $Cr/nm^2$. The impregnated support was then calcined at 800° C. as described above. When tested for ethylene polymerization activity Catalyst H produced an activity of 2.3 kg PE/g/h and polymer having a polydispersity of 10.1 as shown in FIG. 5. Referring to FIG. 5, the polymer produced from Catalyst H displayed a LCB content which peaked at over 40 branches per million carbons, and over 2.0 branches per chain.

Example 4

Figure 6:
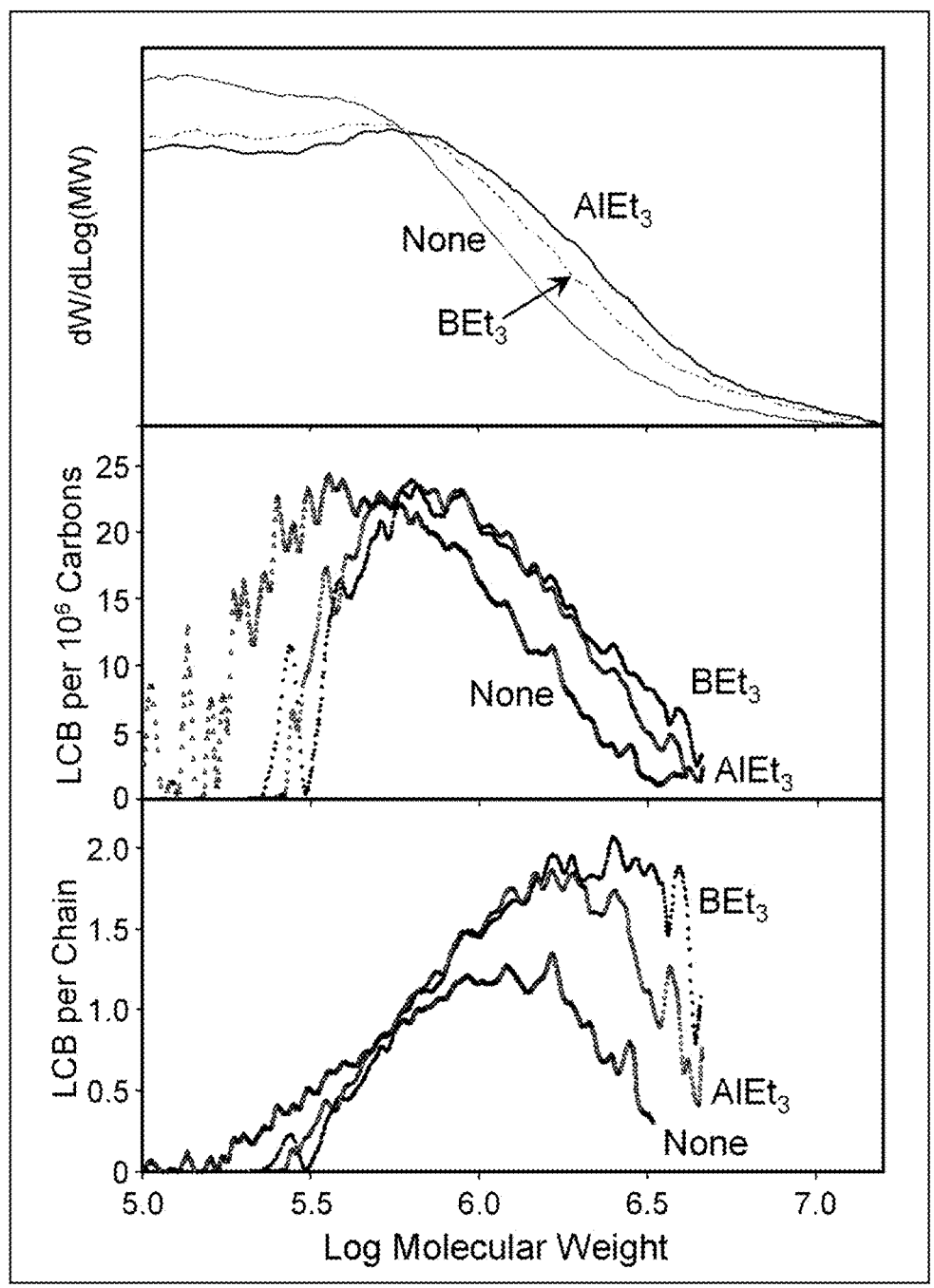

The effect of polymerizing in the presence of a cocatalyst on the LCB content of the polymers was investigated. In two separate runs, Catalyst A (800° C.) was tested with either 10 ppm of triethylaluminum (based on the weight of the isobutane diluent) or with 10 ppm of triethylboron added to the reactor. Under both reaction conditions, the catalysts were quite active, yielding activities of 1.8 and 3.3 kg PE/g/h respectively. They produced polymer with broadened MW distribution (polydispersities of 16.1 and 17.5 respectively). The SEC-MALS results on these polymers are shown in FIG. 6. Referring to the top part of FIG. 6, the results demonstrate that both cocatalysts extended the high-molecular weight side of the molecular weight distribution. Referring to the top part of FIG. 6, the results indicate that cocatalysts do not seem to have increased the amount of LCB. However, the LCB peak has been shifted to higher molecular weight. In the bottom part of FIG. 6, where the LCB is plotted per chain, it was observed that the LCB has been pushed to higher molecular weight demonstrating that the LCB/chain is quite high when cocatalysts are used. For example, the polymer produced using triethylboron displays a LCB peak of approximately 2 branches per chain. Notice also that the LCB content seems to have been pushed out to higher molecular weight by the use of cocatalysts, which produces higher levels of rheological elasticity.

Example 5

Figure 7:
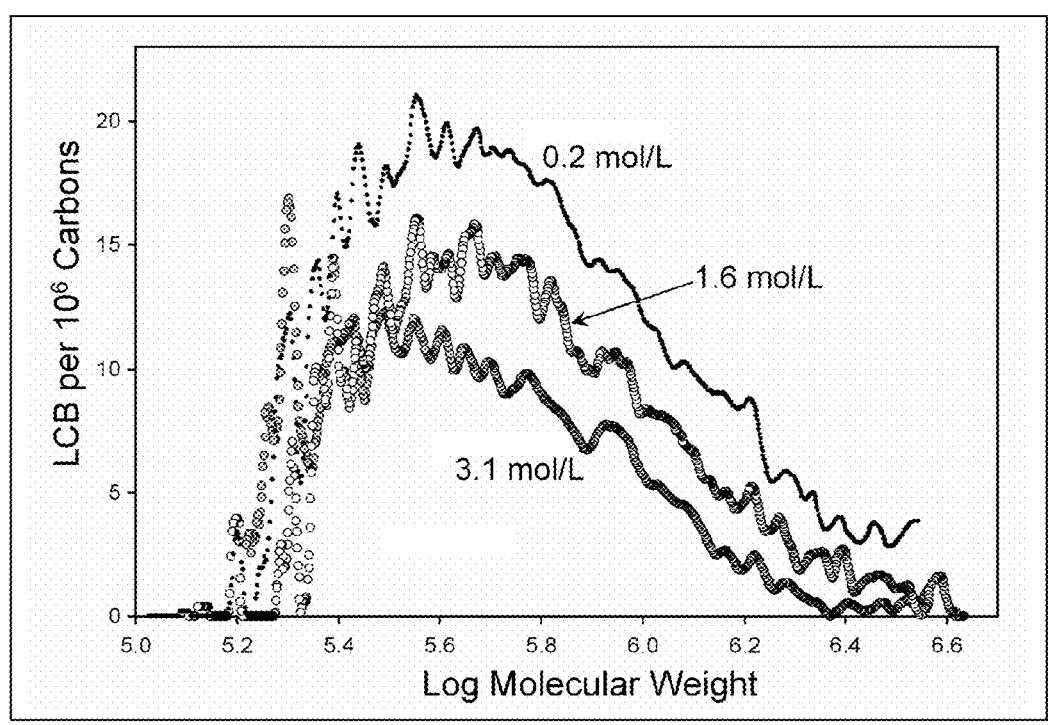

The effect of polymerizing in the presence of a low monomer concentration on the LCB content of the polymers was investigated. Catalyst F was used to polymerize ethylene under varying ethylene concentrations, including as low as 0.2 mol/L ethylene. The polymerizations were carried out at 80° C. with 0.5 ppm TEA. The results of this experiment are summarized, along with all the previous experiments, in Table 1 below. FIG. 7 depicts the effect of varying the concentration of ethylene monomer on the LCB content. Low ethylene concentration was effective at raising the level of LCB, but it also lowered the activity more.

TABLE 1

| Example/Catalyst | Experiment Catalyst & Run Conditions | Activity Kg PE/h | Mw Kg/mol | Mw/Mn | LCB Peak LCB/$10^6$ total carbon atoms |
|---|---|---|---|---|---|
| Ex 1/Catalyst A | $Cr/SiO_2$, 550° C. | 0.6 | 543 | 26.6 | 10 |
| Ex 1/Catalyst A | $Cr/SiO_2$, 800° C. | 1.6 | 380 | 12.2 | 24 |
| Ex 1/Catalyst B | $Cr/SiO_2$-$TiO_2$ 550° C. | 1.6 | 300 | 21.7 | 23 |
| Ex 1/Catalyst B | $Cr/SiO_2$-$TiO_2$ 800° C. | 2.8 | 218 | 27.6 | 35 |
| Ex 1/Catalyst C | $Cr/SiO_2$, SM500, 800° C. | 0.1 | 286 | 10.9 | 28 |
| Ex 1/Catalyst D | $Cr/SiO_2$, 800° C., 300 $m^2/g$ | 0.5 | 262 | 9.4 | 10 |
| Ex 2/Catalyst G | $Cr/SiO_2$, 800° C., 500 $m^2/g$ | 2.4 | 389 | 11.9 | 1.5 |

TABLE 1-continued

| Example/Catalyst | Experiment Catalyst & Run Conditions | Activity Kg PE/h | Mw Kg/mol | Mw/Mn | LCB Peak LCB/$10^6$ total carbon atoms |
|---|---|---|---|---|---|
| Ex 2/Catalyst F | Cr/SiO$_2$, 800° C., 300 m$^2$/g | 3.4 | 345 | 13.3 | 15 |
| Ex 2/Catalyst E | Cr/SiO$_2$, 800° C., 100 m$^2$/g | 1.6 | 423 | 12.2 | 27 |
| Ex 3/Catalyst H | Cr/SiO$_2$, 3.5 Cr/nm$^2$, 800° C. | 2.3 | 355 | 10.1 | 43 |
| Ex 4/Catalyst A | Cr/SiO$_2$, 800° C., BEt$_3$ | 3.3 | 481 | 17.5 | 24 |
| Ex 4/Catalyst A | Cr/SiO$_2$, 800° C., AlEt$_3$ | 1.8 | 460 | 16.1 | 24 |
| Ex 5/Catalyst F | Cr/SiO$_2$, 800° C., 300 m$^2$/g, 0.2 mol/L | 0.9 | 308 | 9.9 | 19 |
| Ex 5/Catalyst F | Cr/SiO$_2$, 800° C., 300 m$^2$/g, 1.6 mol/L | 3.4 | 345 | 11.6 | 15 |
| Ex 5/Catalyst F | Cr/SiO$_2$, 800° C., 300 m$^2$/g, 3.1 mol/L | 3.6 | 378 | 12.1 | 12 |

While various embodiments have been shown and described, modifications thereof can be made without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymer of $C_2$-$C_8$ monoolefin monomers having a polydispersity index of greater than about 20 and a long chain branching content peaking at greater than about 8 long chain branches per million carbon atoms, wherein the long chain branching decreases to approximately zero at the higher molecular weight portion of the molecular weight distribution.

2. The polymer of claim 1 wherein the polymer comprises polyethylene.

3. The polymer of claim 1 wherein the long-chain branching content peaks at about 20 long chain branches per million carbon atoms.

4. The polymer of claim 1 wherein the long-chain branching content peaks at about 25 long chain branches per million carbon atoms.

5. The polymer of claim 1 wherein the long-chain branching content peaks at about 30 long chain branches per million carbon atoms.

6. The polymer of claim 1 wherein the long-chain branching content peaks at greater than about 1.0 long-chain branches per chain.

7. The polymer of claim 1 wherein the long-chain branching content peaks at greater than about 1.3 long-chain branches per chain.

8. The polymer of claim 1 wherein the long-chain branching content peaks at greater than about 1.5 long-chain branches per chain.

9. The polymer of claim 1 having a melt index of from about 0 dg/min to about 100 dg/min.

10. The polymer of claim 1 having a density of from about 0.90 g/cc to about 0.97 g/cc.

11. A method of polymerizing $C_2$-$C_8$ monoolefin monomers comprising contacting the monomers with a chromium supported catalyst under conditions suitable for the formation of a polymer, and recovering the polymer;
wherein the chromium supported catalyst comprises a silica support having a surface area of less than about 200 m$^2$/g; and
wherein the polymer has a polydispersity index of greater than about 20 and a long chain branching content peaking at greater than about 8 long chain branches per million carbon atoms, wherein the long chain branching decreases to approximately zero at the higher molecular weight portion of the molecular weight distribution.

12. The method of claim 11 wherein conditions suitable for formation of a polymer further comprises a cocatalyst.

13. The method of claim 11 wherein the chromium-supported catalyst further comprises titanium.

14. The method of claim 11 wherein the monomer comprises ethylene and the polymer comprises polyethylene.

* * * * *